United States Patent [19]

Becker et al.

[11] Patent Number: 4,843,131
[45] Date of Patent: Jun. 27, 1989

[54] PREPARATION OF POLY(ARYLENE ETHER KETONES) BY SEQUENTIAL OLIGOMERIZATION AND POLYMERIZATION IN DISTINCT REACTION ZONES

[75] Inventors: Paul Becker, San Francisco; Larry M. Edwards, Fremont, both of Calif.; Patrick J. Horner, Swindon, England; A. Brian Macknick, Los Altos Hills, Calif.; Stephen Moore, Redwood City, Calif.; Ronald J. Mosso, Fremont, Calif.

[73] Assignee: Raychem Corporation, Menlo Park, Calif.

[21] Appl. No.: 110,899

[22] Filed: Oct. 20, 1987

[51] Int. Cl.[4] .................... C08G 75/20; C08G 65/00; C08G 67/00
[52] U.S. Cl. .......................... 526/65; 526/66
[58] Field of Search .................... 526/65, 66

[56] References Cited

U.S. PATENT DOCUMENTS

| | | | |
|---|---|---|---|
| 3,065,205 | 11/1962 | Bonner | 528/190 |
| 3,441,538 | 4/1969 | Marks | 528/171 |
| 3,442,857 | 5/1969 | Thornton | 528/26 |
| 3,516,966 | 6/1970 | Berr | 528/182 |
| 3,558,759 | 5/1968 | Sarem | 528/502 |
| 3,751,398 | 8/1973 | Dahl | 528/501 |
| 3,791,890 | 2/1974 | Gander et al. | 528/194 |
| 3,953,400 | 4/1976 | Dahl | 528/206 |
| 3,956,246 | 5/1976 | Dahl | 528/179 |
| 4,008,203 | 2/1977 | Jones | 528/125 |
| 4,239,884 | 12/1980 | Dahl | 528/175 |
| 4,665,151 | 5/1987 | Reamey | 528/181 |
| 4,709,007 | 11/1987 | Jansons et al. | 528/222 |

FOREIGN PATENT DOCUMENTS

971227 9/1964 United Kingdom .
1086021 10/1967 United Kingdom .

*Primary Examiner*—John Kight
*Assistant Examiner*—Frederick Krass
*Attorney, Agent, or Firm*—Yuan Chao; Herbert G. Burkard

[57] ABSTRACT

A method of preparing a poly(arylene ether ketone) by a Friedel-Crafts polymerization wherein a gelled reaction mixture is produced, comprising the steps of:
(A) forming, in a first reactor, a reaction mixture for polymerization comprising
  (I) a monomer system comprising
    (a) (i) phosgene or an aromatic dicarboxylic acid dihalide and (ii) a substantially stoichiometric amount of a polynuclear aromatic comonomer having two active hydrogen atoms or
    (b) a polynuclear aromatic carboxylic acid halide having an active hydrogen atom; and
  (II) a Lewis acid in an amount of at least one equivalent per equivalent of carbonyl groups in the monomer system, plus an amount effective to act as a catalyst for the polymerization;
(B) permitting the reaction mixture to polymerize in the first reactor until substantial partial polymerization has occurred, but before substantial gelation of the reaction mixture;
(C) transferring the partially polymerized reaction mixture into a second reactor having a nozzle at one end thereof and a piston which, in its retracted position, is at the other end of the second reactor and has a stroke substantially equal to the length of the second reactor;
(D) permitting polymerization to continue in the second reactor until a gelled, polymerized reaction mixture containing polymer of the desired molecular weight has been obtained;
(E) discharging the gelled, polymerized reaction mixture from the second reactor through the nozzle by stroking the piston the length of the second reactor; and
(F) recovering and purifying the polymer.

25 Claims, 6 Drawing Sheets

FIG_1

FIG_2

FIG_3

FIG_4a

FIG_4b

FIG_5a

FIG_5b

FIG_6

PREPARATION OF POLY(ARYLENE ETHER KETONES) BY SEQUENTIAL OLIGOMERIZATION AND POLYMERIZATION IN DISTINCT REACTION ZONES

BACKGROUND OF THE INVENTION

This invention relates to a method of preparing poly(arylene ether ketones).

Poly(arylene ether ketones), in particular para-linked poly(arylene ether ketones), possess many desirable properties, for example, high temperature stability, mechanical strength, and resistance towards common solvents. The preparation of poly(arylene ether ketones) by two different approaches has been described in the literature. The first approach is an electrophilic synthesis in which an aryl ketone linkage is formed. The second approach is a nucleophilic synthesis in which an aryl ether linkage is formed.

In an electrophilic synthesis, the polymerization step involves the formation of an aryl ketone group derived from reaction the between an aromatic acid halide functional group and an activated hydrogen atom attached to an aromatic carbon atom, i.e., a hydrogen displaceable under the electrophilic reaction conditions. The monomer system employed in the polymerization can be, for example, (a) phosgene or an aromatic diacid dihalide and a polynuclear aromatic compound containing two activated hydrogen atoms, for example, terephthaloyl chloride and 1,4-diphenoxybenzene; or (b) a polynuclear aromatic compound containing both an acid halide group and an activated hydrogen atom, for example, p-phenoxybenzoyl chloride.

Electrophilic polymerizatons of this type are often referred to as Friedel-Crafts polymerizations. Typically, such polymerizations are carried out in a reaction medium comprising the reactant(s), a catalyst, such as anhydrous aluminum trichloride, and an inert solvent such as methylene chloride. Because the carbonyl groups of the reactant(s) and/or product(s) complex with aluminum trichloride and thereby deactivate it, the aluminum trichloride catalyst is generally employed in an amount slightly more than one equivalent for each equivalent of carbonyl groups in the reaction medium. Other metal halides such as ferric chloride may be employed as the catalyst. The preparation of poly(arylene ether ketones) by Friedel-Crafts polymerization is disclosed by Bonner, in U.S. Pat. No. 3,065,205; Berr, in U.S. Pat. No. 3,516,966; Jones, in U.S. Pat. No. 4,008,203; Goodman et al., in G.B. Pat. No. 971,227; and Jones, in G.B. Pat. No. 1,086,021.

The polymers as initially produced by these processes are generally relatively intractable and difficult to isolate and purify. Gander et al., in U.S. Pat. No. 3,791,380, address this problem and disclose a process which permits the preparation of polyketones in granular form. Their process comprises bringing into contact, in an organic medium, diphenyl ether and a stoichiometric amount of at least one compound selected from terephthalic and isophthalic acid chlorides with aluminum chloride catalyst and completing the reaction by abruptly dispersing the reaction mixture into a higher temperature fluid maintained at a temperature of about from 50° C. to 130° C., to effect an abrupt rise in temperature, the volume of said fluid being at least 200 percent of the initial volume of the reaction mixture, the reaction mixture being dispersed (a) prior to coagulation of the mixture and (b) after the elapse of at least 25 percent of the time period between the completion of the combination of reactants, including catalyst, and the coagulation of the reaction mixture. This process requires critical timing as the reaction mixture must be dispersed before gelation occurs. Further, the process subjects the reaction mixture to relatively high temperatures, thereby increasing the possibility of side reactions. The resulting product is granular and may entrap catalyst residues making purification more difficult.

Another solution to the problem of an intractable polymerization medium is the use of boron trifluoride catalyst in anhydrous hydrogen fluoride. See, for example, Marks, in U.S. Pat. No. 3,441,538; Thornton, in U.S. Pat. No. 3,442,857; Dahl, in U.S. Pat. No. 3,953,400; and Dahl et al., U.S. Pat. No. 3,956,240. The resulting polymer-catalyst complex is soluble in the hydrogen fluoride/boron trifluoride reaction medium. Recovery of the polymer from this reaction mixture and decomplexation of the polymer-catalyst complex while in solution are disclosed by Dahl in U.S. Pat. Nos. 3,751,398 and 4,239,884. However, the use of boron trifluoride and hydrogen fluoride requires special techniques and equipment making this process difficult to practice on a commercial scale.

Jansons et al., in U.S. Pat. No. 4,709,007 (1987) disclose an improved process for preparing poly(arylene ether ketones) in which a Lewis base controlling agent or, alternatively, a specified, exceptionally large excess of Lewis acid catalyst is used. This process, besides producing polymers of higher quality (higher molecular weight, with little or no ortho substitution), maintains the polymer in solution or in a more tractable state, facilitating its recovery and purification.

Yet another solution to the intractability problem is proposed by Reamey in U.S. Pat. No. 4,665,151. Reamey discloses that an intractable gel resulting from a Friedel-Crafts polymerization can be converted into a tractable gel or even a liquid reaction product by treatment with a liquefaction agent, such as anhydrous hydrogen chloride. However, Reamey's method has the disadvantage that additional material must be added to the polymerization mixture, requiring adaptation of the polymerization equipment with a means for introducing that material and a means for metering the requisite amount.

It would thus be desirable to be able to work up and isolate the poly(arylene ether ketone) product directly from a gelled Friedel-Crafts polymerization mixture without the need for the introduction of any additional components. The present invention provides such a method.

SUMMARY OF THE INVENTION

This invention provides a method of preparing a poly(arylene ether ketone) by a Friedel-Crafts polymerization wherein a gelled reaction mixture is produced, comprising the steps of:

(A) forming, in a first reactor, a reaction mixture for polymerization comprising
  (I) a monomer system comprising
    (a) (i) phosgene or an aromatic dicarboxylic acid dihalide and (ii) a substantially stoichiometric amount of a polynuclear aromatic comonomer having two active hydrogen atoms or
    (b) a polynuclear aromatic carboxylic acid halide having an active hydrogen atom; and (II) a Lewis acid in an amount of at least one equivalent per equivalent of carbonyl groups in the monomer system, plus an amount effective to act as a catalyst for the polymerization;

(B) permitting the reaction mixture to polymerize in the first reactor until substantial partial polymerization has occurred, but before substantial gelation of the reaction mixture;

(C) transferring the partially polymerized reaction mixture into a second reactor having a nozzle at one end thereof and a piston which, in its retracted position, is at the other end of the second reactor and has a stroke substantially equal to the length of the second reactor;

(D) permitting polymerization to continue in the second reactor until a gelled, polymerized reaction mixture containing polymer of the desired molecular weight has been obtained;

(E) discharging the gelled, polymerized reaction mixture from the second reactor through the nozzle by stroking the piston the length of the second reactor; and (F) recovering and purifying the polymer.

In a preferred embodiment of the invention, the reaction mixture comprises (I) a monomer system comprising
  (a) (i) phosgene or an aromatic dicarboxylic acid dihalide and (ii) a substantially stoichiometric amount of a polynuclear aromatic comonomer having two active hydrogen atoms or
  (b) a polynuclear aromatic carboxylic acid halide having an active hydrogen atom;

(II) a Lewis base in an amount from 0.01 to about 4 equivalents per equivalent of acid halide groups present in the monomer system;

(III) a Lewis acid in an amount of at least one equivalent per equivalent of carbonyl groups in the monomer system, plus about one equivalent per equivalent of Lewis base, plus an amount effective to act as a catalyst for the polymerization; and (IV) a non-protic diluent in an amount from 0 to about 93% by weight, based on the weight of the total reaction mixture.

DETAILED DESCRIPTION OF THE INVENTION

The monomer system for the polymerizations of this invention comprises (a) (i) phosgene or an aromatic dicarboxylic acid dihalide and (ii) a substantially stoichiometric amount of a polynuclear aromatic comonomer having two active hydrogen atoms or (b) a polynuclear aromatic carboxylic acid halide having an active hydrogen atom.

"Substantially stoichiometric" means that the molar amount of phosgene or aromatic dicarboxylic acid dihalide is substantially equal to the molar amount of polynuclear aromatic comonomer having two active hydrogen atoms. A slight stoichiometric imbalance may be employed, for the purpose of molecular weight control or capping, as is well known in the art and is discussed in more detail hereinbelow.

Suitable aromatic dicarboxylic acid dihalides include: terephthaloyl chloride, isophthaloyl chloride, [1,1'-biphenyl]-4,4'-dicarbonyl dichloride, naphthalene-1,4-dicarbonyl dichloride, naphthalene-2,6-dicarbonyl dichloride, naphthalene-3,6-dicarbonyl dichloride, benzophenone-4,4'-dicarbonyl dichloride, and diphenyl ether-4,4'-dicarbonyl dichloride. Terephthaloyl chloride, isophthaloyl chloride, [1,1'-biphenyl]-4,4'-dicarbonyl dichloride, and diphenyl ether-4,4'-dicarbonyl dichloride are preferred.

Suitable polynuclear aromatic comonomer having two active hydrogen atoms include: diphenyl ether, 1,4-diphenoxybenzene, 4-phenoxybiphenyl 4,4'-diphenoxybiphenyl, 4,4'-diphenoxybenzophenone, 4,4'-diphenoxydiphenylsulfone, 1,3-bis(4-phenoxybenzoyl)benzene, and 1,4-bis(4-phenoxybenzoyl)benzene. Diphenyl ether, 1,4-diphenoxybenzene, 4,4'-diphenoxybenzophenone, 1,3-bis(4-phenoxybenzoyl)benzene, and 1,4-bis(4-phenoxybenzoyl)benzene are preferred.

Suitable polynuclear aromatic carboxylic acid halides having an active hydrogen atom include: p-phenoxybenzoyl chloride, 4-biphenyloxybenzoyl chloride, 4'-phenoxybiphenyl-4-carbonyl chloride, and 4'-phenoxybenzophenone-4-carbonyl chloride. p-Phenoxybenzoyl chloride is preferred.

While in the above exemplifications carboxylic acid chlorides are recited, other acid halides, particularly the fluorides and the bromides, may be used. Generally, the acid chlorides are preferred because of their availability and reactivity. Other groups displaceable under Friedel-Crafts conditions may also be used, such as OR, where R is methyl, ethyl, isopropyl or other lower alkyl.

Poly(arylene ether ketones) further comprising imide, amide, ester, azo, quinoxaline, benzimidazole, benzoxazole, or benzothiazole groups may be prepared according to the method of this invention, by using monomers having such groups. Illustrations of monomers having such groups are found in Dahl et al., EP No. 178,185 (1986), the disclosure of which is incorporated herein by reference.

Combinations of monomers (a) and monomers (b) can be used to prepare copolymers.

The term "Lewis acid" is used herein to refer to a substance which can accept an unshared electron pair from another molecule. Lewis acids which can be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. A preferred Lewis acid is aluminum trichloride.

A preferred Friedel-Crafts process for practicing this invention is described by Jansons et al., in U.S. Pat. No. 4,709,007 (1987), the disclosure of which is incorporated herein by reference. This application discloses a method of moderating or controlling Friedel-Crafts polymerizations by the addition of a Lewis base which acts as a controlling agent or by using specified excesses of the Lewis acid.

Preferred Lewis bases include diphenyl sulfone, dimethyl sulfone, N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, potassium chloride, potassium bromide, and mixtures thereof. Particularly preferred Lewis bases are lithium chloride, N,N-dimethylformamide, tetramethylene sulfone, and dimethyl sulfone.

The amount of Lewis base present should be from 0 to about 4 equivalents per equivalent of acid halide groups present in the monomer system. Amounts greater than 4 equivalents could be employed, if desired. However, no additional controlling effect is usually achieved by adding larger amounts. Thus, it is preferred to use no more than about 4 equivalents and generally no more than about 2 equivalents. When a Lewis base is added to control the reaction, at least about 0.01, preferably at least about 0.05 and most preferably at least about 0.5 equivalents of Lewis base per equivalent of acid halide groups present should be used.

Additionally, protic controlling agents, such as water, n-alkanols, or benzoic acid may be used, as described in the copending application of Towle, Ser. No. 96,415 filed Sept. 11, 1987, the disclosure of which is incorporated herein by reference.

The temperature at which the reaction is conducted is not critical and can be from about −70° C. to about +150° C., or even higher. It is preferred to start the reaction at lower temperatures, for example at −50° to about −10° C., particularly if the monomer system contains highly reactive monomers. After polymerization has commenced, the temperature can be raised if desired, for example, to increase the rate of reaction. It is generally preferred to carry out the reaction at temperatures in the range of between −30° C. and +25° C. (room temperature).

The reaction can also be moderated by use of an appropriate excess of Lewis acid. In general, the amount of Lewis acid is used in amount of at least one equivalent per equivalent of carbonyl and other basic groups present in the reaction mixture, plus an amount effective to act as a catalyst. In preparing the copolymers of this invention the catalytically effective amount should be between about 0.003 and about 0.5 equivalent per equivalent of acid halide groups.

The polymerization can be carried out in the presence of a non-protic—also known as aprotic—diluent. Preferred nonprotic diluents include methylene chloride, carbon disulfide, o-dichlorobenzene, 1,2,4-trichlorobenzene, o-difluorobenzene, 1,2-dichloroethane, 1,1,2,2-tetrachloroethane, and the like.

Polymers prepared according to this invention are preferably high molecular weight polymers. By "high molecular weight," it is meant a polymer having an inherent viscosity greater than about 0.6 dL/g. Preferably the polymer has an inherent viscosity in the range of about 0.6 to about 2.0 dL/g. Polymers having an inherent viscosity below about 0.6 are generally not useful because they have poor mechanical properties, such as low tensile strength and elongation, while polymers having an inherent viscosity above about 2.0 are very difficult to melt process. Throughout this application, inherent viscosity refers to the mean inherent viscosity determined according to the method of Sorenson et al., "Preparative Methods of Polymer Chemistry," 2nd ed. (Interscience 1968), at page 44 (0.1 g polymer dissolved in 100 ml of concentrated sulfuric acid at 25° C.). However, those skilled in the art will appreciate that in particular applications, for example, where material for chain-extension reactions is being prepared, lower molecular polymer or oligomer may be desirable, and that such polymer or oligomer may be obtained by molecular control methods as taught herein.

If desired, the molecular weight of the polymer, the degree of branching, and the amount of gelation can be controlled by use of, for example, capping agents as described by Dahl in U.S. Pat. No. 4,247,682, the disclosure of which is incorporated herein by reference. The molecular weight of the polymer can also be controlled by employing a slight excess of one of the monomers.

Capping agents, when employed, are added to the polymerization reaction medium to cap the polymer on at least one end of the polymer chain. This terminates continued growth of the chain and controls the resulting molecular weight of the polymer, as shown by the inherent viscosity of the polymer. Judicious use of the capping agents results in a polymer within a selected narrow molecular weight range, decreased gel formation during polymerization, and decreased branching of the polymer chains and increases melt stability. Both nucleophilic and electrophilic capping agents can be used to cap the polymer at each end of the chain.

Preferred nucleophilic capping agents are 4-chlorobiphenyl, 4-phenoxybenzophenone, 4-(p-phenoxyphenoxy)benzophenone, biphenyl, 4-benzenesulfonylphenyl phenyl ether, and the like.

Typical electrophilic capping agents are compounds of the formula wherein Ar is phenyl, 3-chlorophenyl, 4-chlorophenyl, 4-cyanophenyl, 4-methylphenyl, napthyl, biphenyl, or an aromatic group substituted with an electron withdrawing substituent and E is halogen or other leaving group, preferably chloride. Preferred electrophilic capping agents include benzoyl chloride, benzenesulfonyl chloride, and the like.

According to the method of this invention, polymerization is initiated by combining in a first reactor the monomer(s) and the Lewis acid, and optional materials such as a Lewis base, a non-protic diluent, and capping agent(s). Polymerization is allowed to proceed until substantial partial polymerization has occurred, by which is meant a degree of polymerization such that a significant viscosity build-up has occurred in the reaction mixture, but before it has substantially gelled, so that it can still be readily discharged from the first reactor. The viscosity of the reaction mixture at this point is preferably between about 1,500 and about 12,000 centipoise, more preferably between about 4,000 and about 10,000 centipoise, at the discharge temperature. Preferably the first reactor is stirred, to efficiently dissolve the monomers and catalyst, ensure homogeneity of the reaction mixture prior to its discharge from the first reactor, and to help control the initial exotherm of the polymerization reaction.

Next, the partially polymerized reaction mixture is transferred from the first reactor into a second reactor, which has a piston, which, in a retracted position, defines one end of the second reactor, and a nozzle at the other end thereof. The stroke of the piston is substantially equal to the length of the second reactor. Polymerization is allowed to proceed in the second reactor until polymer of the desired molecular weight has been formed. Then, the polymerized and gelled reaction mixture is discharged through the nozzle by stroking the piston the length of the second reactor.

It is preferred that the polymerization temperature in the first reactor be somewhat lower than the polymerization temperature in the second reactor, which in turn should be lower than the temperature at which undesirable side reactions occur. At the same time, the polymerization is preferably conducted at the highest temperature consistent with the avoidance of undesirable side reactions, for faster polymerization and turnaround times. Friedel-Crafts polymerizations are exothermic, the exact extent of exotherm being dependent on parameters such as the type of monomers used and their concentration but generally being greatest at the early stages of polymerization. Stirring in the first reactor provides for a more efficient heat transfer and permits the maintenance of a lower polymerization temperature by temperature control means such as jackets or internal or external cooling coils, while the second reactor, being unstirred, is less capable of dissipating the heat of polymerization. Upon transfer of the reaction mixture to the second reactor, there may be a slight rise in the polymerization temperature because of the latter's lesser ability to remove the remaining heat of reaction via conduction. If the temperature of the reaction mixture at transfer is slightly below the desired temperature (from the point of view of combining rapid polymerization but yet avoiding side reactions), the rise will help bring the polymerization temperature to the desired temperature. Conversely, if transfer takes place at the desired temperature, it may be difficult to prevent the temperature in the second recctor from rising above it, to an undesirably high level. For example, polymerization in the first reactor may be initiated at about $-15°$ C. and allowed to increase to between about $0°$ and about $+35°$ C., depending on the specific monomer system, while polymerization in the second reactor may be conducted at a temperature between about $0°$ and $+35°$ C. Temperature control in the second reactor can be accomplished by jacketing or by providing it with external cooling coils.

The first reactor should be resistant to chemical attack by the relatively acidic Friedel-Crafts polymerization medium. It can be made of or lined with materials such as glass, inert polymers, or metal alloys such as Hastelloy B-2. During polymerization, the stirred reactor can be vented to prevent the pressure buildup due to the evolution of hydrogen halide from the reaction mixture, but the reaction mixture should be protected from atmospheric moisture by a nitrogen blanket or trap. It is usually desirable to maintain a pressure of $>30$ psig to prevent foaming of the reaction mixture by hydrogen chloride evolution.

A preferred method for transferring the reaction mixture from the first to the second reactor is to use a combination of gravity and a positive nitrogen pressure, while simultaneously stroking the piston of the second reactor from a fully extended to a retracted position. In this way, the reaction mixture is constantly under pressure and does not foam, nor are any voids formed inside the second reactor. Alternatively to retracting the piston to charge the second reactor without forming any voids, the second reactor may be equipped with a vent adjacent to the retracted piston.

During the second reactor stage, the polymerization reaction is completed. Because of its gelled state, the polymerzed reaction mixture would be very difficult to discharge from a conventional reactor. However, the piston/nozzle feature permits its convenient discharge for work-up and isolation of the polymer.

The second reactor should be also protected from chemical attack or corrosion. This can be accomplished by lining the reactor walls with a fluoropolymer such as poly(tetrafluoroethylene) (PTFE) or a copolymer of tetrafluoroethylene and perfluoroalkylvinyl ether, commercially available under the trade name Teflon PFA (du Pont). The fluoropolymer lining can be applied by coating or by swaging a tube of the fluoropolymer into the reactor. Thus, PTFE-lined stainless or carbon steel would be suitable constructions. Alternatively, the second reactor can be made from a tube of suitable polymer (e.g., PTFE) around which is wound a fiber-glass reinforced composite to provide mechanical strength, although in such a construction heat transfer would not be as efficient.

Another consideration in the selection of materials for the second reactor is that the polymerized, gelled reaction mixture should adhere minimally to it and release cleanly during the discharge process. Then, the power required to drive the piston is reduced and complete discharge, without leaving behind residues which might contaminate subsequent batches, can be effected. Fluoropolymers such as PTFE or Teflon PFA are also preferable because of their nonadhesive properties.

The second reactor should be constructed to resist the significant pressure build-ups which occur during the polymerization or discharge process. During polymerization, the pressure build-up may be as high as 150 psi. During discharge, the pressure may be as high as 650 psi or even higher, depending on reactor geometry. Preferably, the second reactor is capable of withstanding an internal pressure of at least 650 psi, preferably at least 950 psi.

The piston is preferably coated with material such as a fluoropolymer (e.g., PTFE) to protect against corrosion, to minimize adherence of gel to it, and to reduce friction during a stroke. A tight seal between the piston and the reactor wall should be maintained to prevent leakage. This can be accomplished by fitting the piston with an O-ring. Fluoroelastomers such as Viton or Kalrez are suitable materials for the O-ring. If the gap between the piston and the reactor wall is greater than about 0.08 mm, excessive reaction mass may build up in the O-ring groove and compromise its sealing performance. A small gap also helps prevent extrusion of the O-ring around the groove in the axial direction and to guide the piston down the tube. Those skilled in the art will appreciate that, despite such precautions, there will be some wear and tear on the O-ring and some reaction mixture will enter into the groove, necessitating periodic replacement of the O-ring. Other means of sealing the piston, such as T-seals, cut lip seals, U-packing, and chevron packing may also be used.

The piston is conveniently driven by a hydraulic cylinder and shaft, although other drive means, for example, hydraulic or gas pressure or a screw may be used. The drive means should be sufficiently powerful to expel substantially all of the gelled or highly viscous reaction mixture from the second reactor through the nozzle.

The polymerized reaction mixture is discharged through the nozzle. The nozzle can also be the inlet for the reaction mixture during charging, in which case it is alternatively connected to the stirred reactor during charging and a receiving apparatus during discharge. In another embodiment, the second reactor may be equipped with both a discharging nozzle and a separate inlet.

The second reactor preferably has an interior length-to-interior diameter ratio (L/D) of at least 5, more preferably at least 10. A large L/D permits efficient control of the reaction mixture temperature. If the L/D is too low, there could be an undesirable temperature rise in the center of the reaction mixture. Also, a large L/D minimizes the power that is required to drive the piston in discharging the polymerized reaction mixture, for a given reactor volume and discharge nozzle geometry.

In a preferred embodiment, the nozzle is conical in shape, the base of the cone coinciding with the cross-section of the second reactor. In this case, the front of the piston should also be conical in shape and fit snugly in the nozzle, to ensure complete discharge.

Where the second reactor is of a large size, by which is meant a size greater than 12 inches in diameter, it is preferably operated in a vertical configuration, because the weight of the piston may cause it to drag along the bottom of the reactor, resulting in galling of the surfaces and deterioration of the seal. Smaller reactors may be operated in either a vertical or horizontal configuration or at intermediate angles.

The polymer, at the end of the polymerization, contains Lewis acid complexed to its carbonyl groups. For many polymerizations, the Lewis acid is complexed to substantially all the carbonyl groups in the polymer. As is well known with polymers of this type, the catalyst residue must be removed, i.e., the Lewis acid must be decomplexed from the polymer and removed. A method for removing the catalyst residue is described by Dahl in U.S. Pat. No. 4,237,884, the disclosure of which is incorporated herein by reference. Decomplexation can be accomplished by treating the polymerization reaction mixture with a decomplexing base after completion of polymerization. The decomplexing base must be at least as basic towards the Lewis acid as the basic groups on the polymer chain. Such decomplexation should be effected before the isolation of the polymer from the reaction mixture.

The amount of decomplexing base used should be in excess of the total amount of bound (complexed) and unbound Lewis acid present in the reaction mixture and is preferably at least twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulfide, tetramethylene sulfone, benzophenone, tetramethylammonium chloride, isopropanol, and the like.

To facilitate decomplexation and handling, it is desirable to discharge the gelled, polymerized reaction mixture from the second reactor into an apparatus capable of cutting the gel into small pieces, preferably less than ¼ in across. Small sized gel particles can readily be transferred or otherwise handled as a slurry. Decomplexation is easier and more complete and the decomplexation exotherm is better controlled, because of the increased surface-to-volume ratio. A Rietz disintegrator (hammer-mill) made by Bepex Corporation, Santa Rosa, California, is such an apparatus. Other suitable apparatuses are a Fitzmill comminutor (Fitzpatrick Company, Elmhurst, Illinois) and colloid mills. Generally, any of various methods of size reduction known in the art may be used. Alternatively, the gel may be forced through a screen or extruded through a multi-hole die and cut into pellets at the low-pressure side of the die. For example, with a ⅛ inch screen, a range of particle sizes ranging from about 1/100 to 3/16 inch is obtained.

Figure 1:
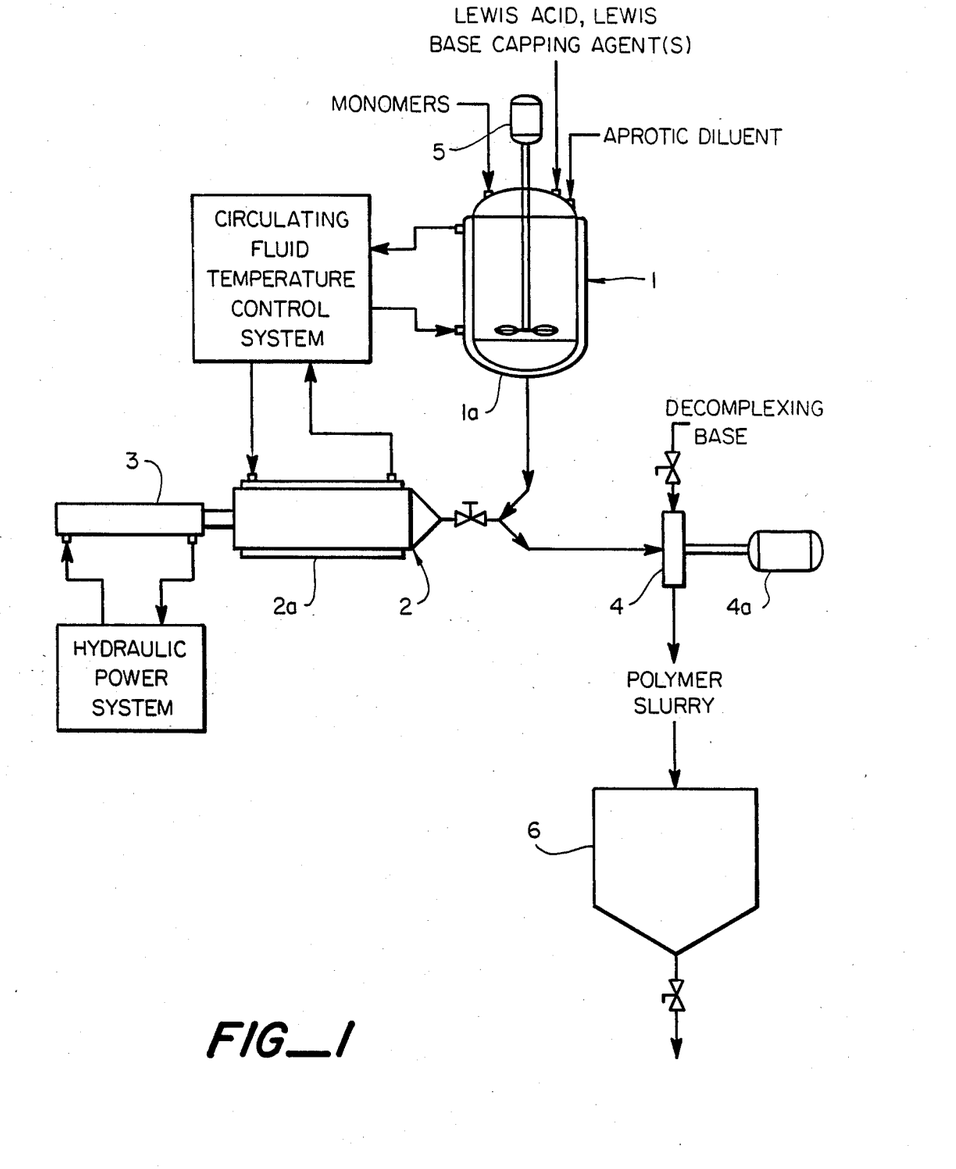
FIG. 1 depicts schematically the process and preferred reactors of this invention.

The process and equipment of preferred embodiments of this invention may be further understood by reference to the figures, which are now discussed in detail. FIG. 1 depicts schematically the process of this invention. The monomers, Lewis acid, Lewis base, capping agent(s) (if any) and aprotic diluent (if any) are charged into a first reactor 1, which is a pressure resistant vessel equipped with a temperature control jacket 1a and motorized agitator 5. At the appropriate stage of the polymerization, the polymerization mixture is transferred from the first reactor 1 to the second reactor 2, which is equipped with a piston (obscured, not depicted), a temperature control jacket 2a, and a hydraulic cylinder/shaft 3 for driving the piston. Upon completion of polymerization, the polymer-containing reaction mixture is discharged from reactor 2 into a hammer-mill 4 by stroking the piston. The hammer-mill is driven by a motor 4a. Decomplexing base is added to the polymerized reaction mixture in the hammer-mill. The resultant polymer slurry is then transferred to a receiving vessel 6, for further purification steps such as decomplexation, digestion, or washing.

Figure 2:
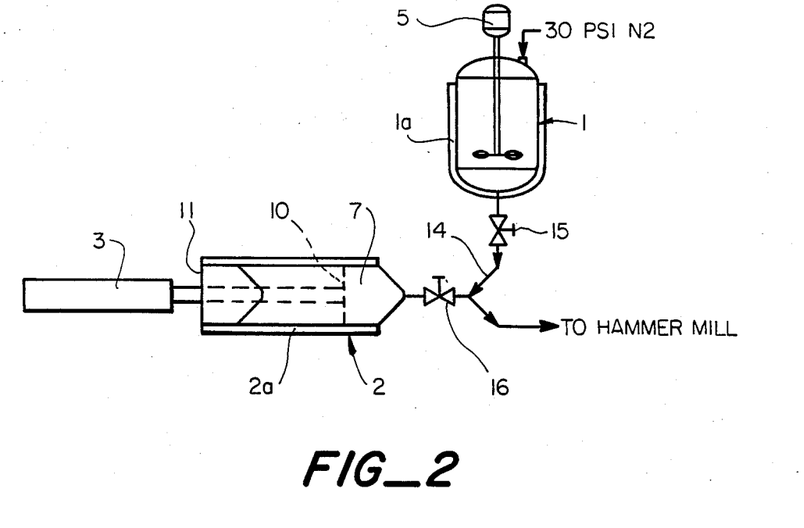
FIGS. 2 and 3 depict preferred methods for transferring the partially polymerized reaction mixture from the first reactor to the second reactor.

FIG. 2 depicts the embodiment of this invention wherein the transfer of the polymerization mixture from the first reactor 1 to the second reactor 2 is effected with simultaneous retraction of the piston 7, to reduce void formation. When the polymerization mixture is ready for transfer, valves 15 (at the bottom of the first reactor 1) and 16 (at the nozzle end of the second reactor 2) are opened, permitting the polymerization mixture to flow from one reactor to the other through transfer line 14 by a combination of nitrogen pressure and gravity (the first reactor being positioned higher than the second reactor. At the initiation of transfer, piston 7 is at an extended position 10. As transfer progresses, it is steadily retracted, until it is at a retracted position 11 at the completion of transfer.

Figure 3:
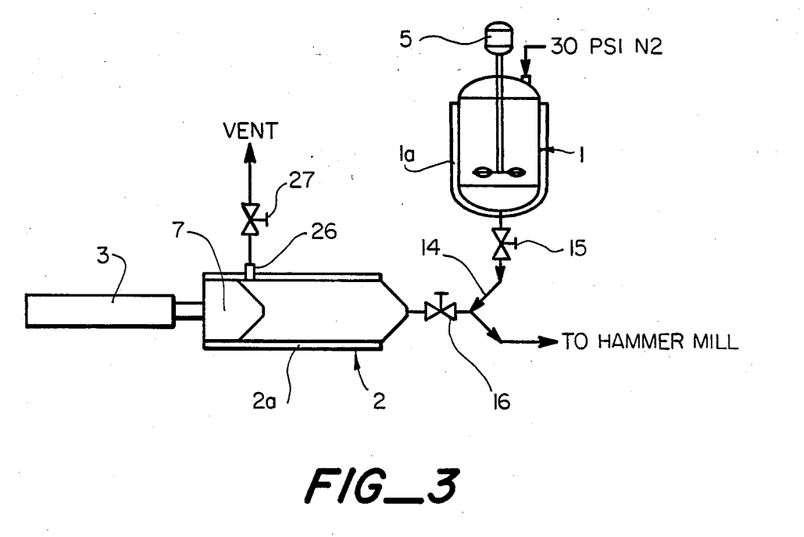

FIG. 3 depicts the embodiment of this invention wherein the second reactor 2 is equipped with a valve 26 adjacent to the retracted position of piston 7, to facilitate void-free transfer. As in FIG. 2, the partially polymerized reaction mixture is transferred from first reactor 1 to second reactor 2 via opened valves 15 and 16 and transfer line 14, by a combination of gravity feed and applied nitrogen pressure. However, piston 7 is initially and remains in a retracted position. Vent valve 27 is opened, permitting air inside reactor 2 to exit, thus ensuring a void-free filling of the reactor 2.

Figure 4A:
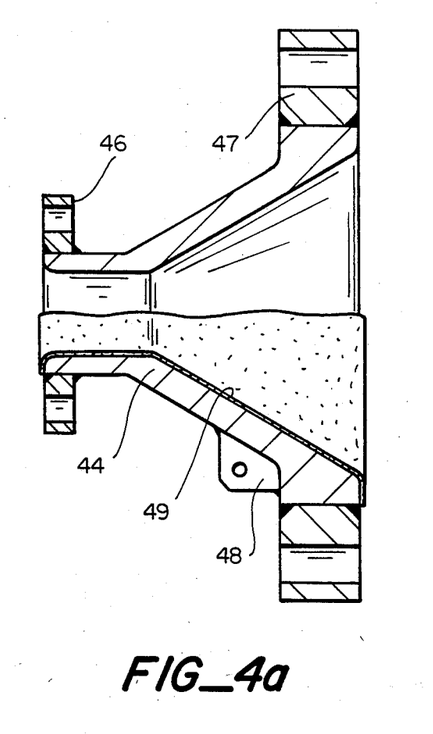
FIG. 4a depicts in cross-section a preferred conically shaped nozzle for a second reactor of this invention.
Figure 4B:
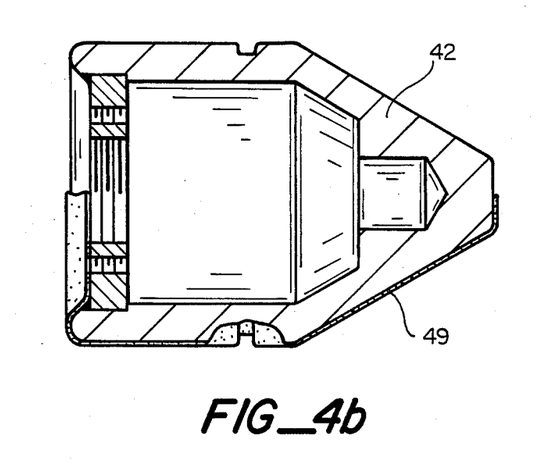
FIG. 4b depicts in cross-section the corresponding piston.

FIG. 4a shows in detail a conical nozzle end of a second reactor according to the invention. Nozzle 44 is equipped with a front and a rear flange 46 and 47, respectively, and a lifting lug 48. It is lined with a PTFE coating 49 (shown on one half only). FIG. 4b shows in detail a corresponding tapered or conical piston 42 for fitting within the conical nozzle 44, also having a PTFE coating 49.

Figure 5A:
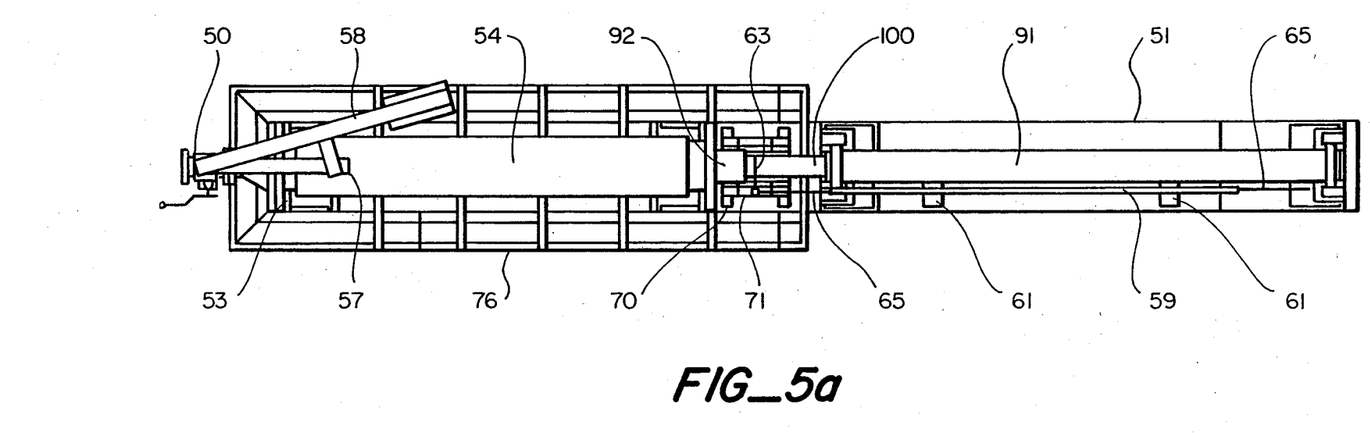
FIGS. 5a and 5b depict in plan and elevation views, respectively, a preferred second reactor of this invention.
Figure 5B:
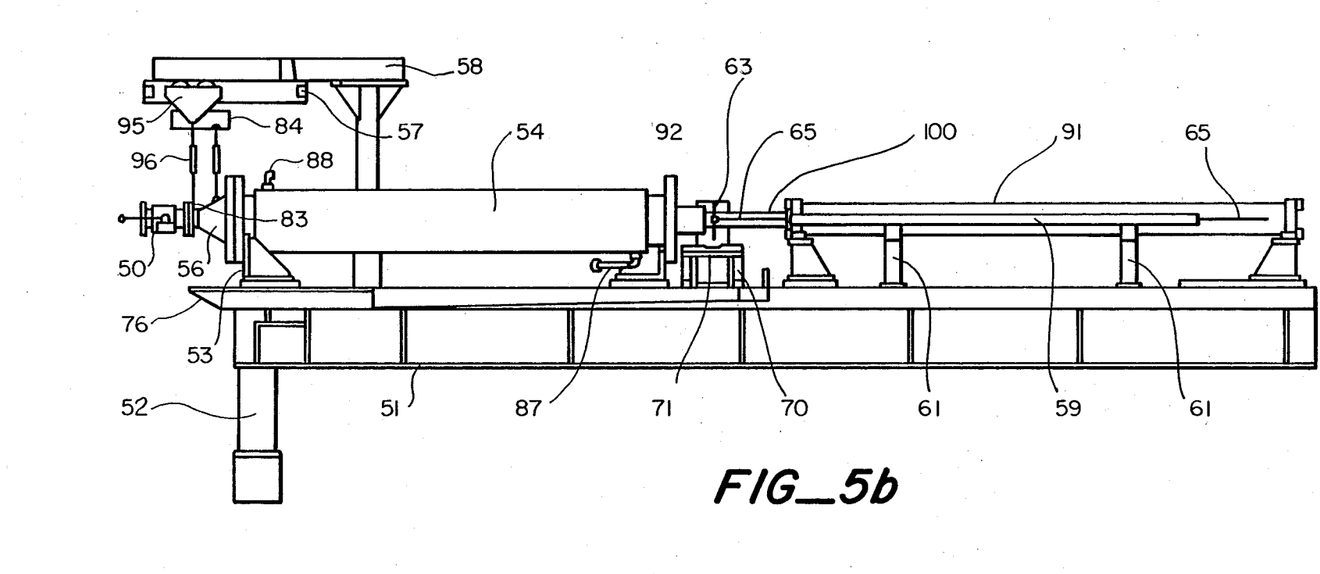

FIG. 5a and 5b show in detailed plan and elevation views, respectively, a preferred second reactor of this invention. Reactor body 54 and its hydraulic cylinder 91 are supported by a rigid base frame 51, in turn supported by a pedestal 52. Body 54 is mounted on the frame 51 by a reactor bracket 53. To guard against spillage, the set-up is provided with a drip pan 76. At one end of the reactor is a conical nozzle 56, to which is attached a Teflon-PFA lined valve 50. To facilitate disconnection of the nozzle from body 54, there is provided a davit crane 58, equipped with a trolley 95, lifting fixture bar 84, turnbuckle 96, trolley stop 57, and lifting fixture plate 83. Temperature control fluid is circulated in a temperature control jacket (obscured, not shown) through inlet 87 and outlet 88. Hydraulic cylinder 91 is connected to body 54 by an alignment coupler 92. Shaft 100 is supported by a piston support 70 having a support pad 71. To indicate the position of the piston within the body 54, there is provided an indicator rod 65, driven by an indicator drive disc 63. Rod 65 is also protected by a cover 59, supported by base 61.

Figure 6:
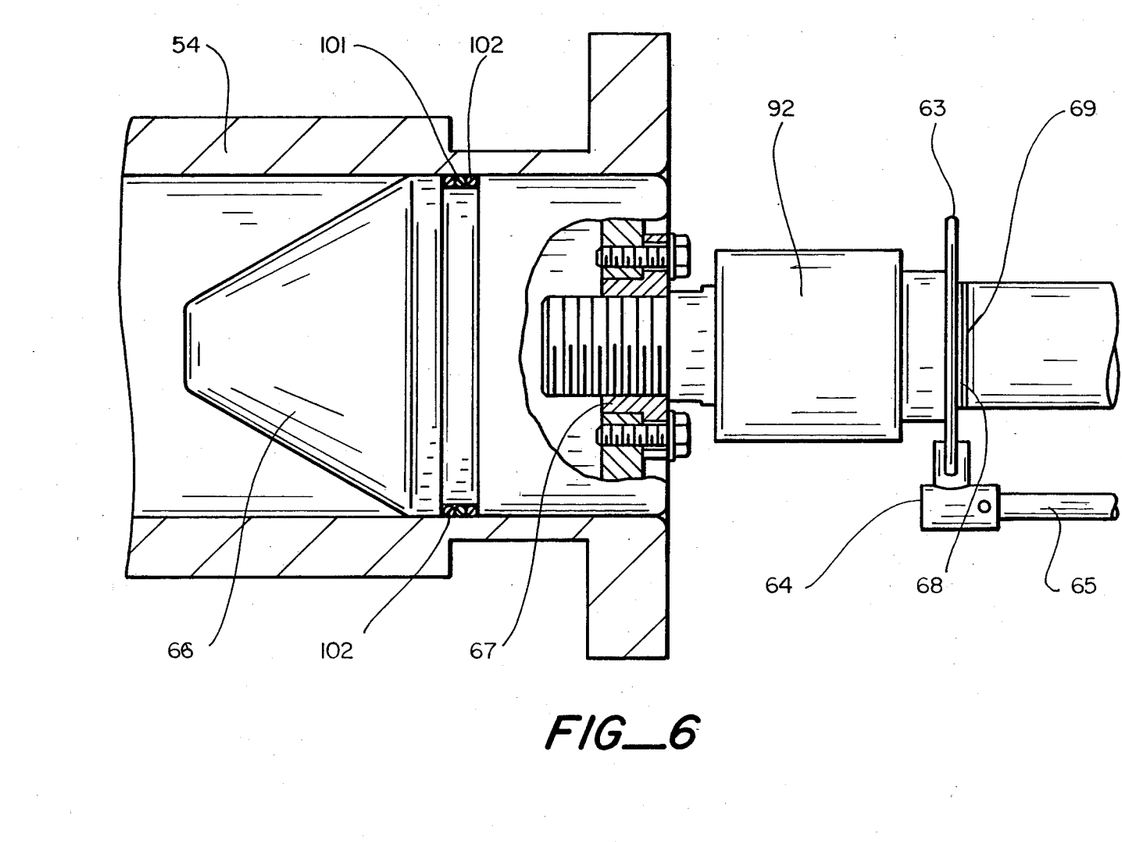
FIG. 6 depicts in a magnified cut-away view the piston at the rear end of the second reactor of FIG. 5a and 5b.

FIG. 6 is a magnified cutaway view of piston 66, positioned at the rear end of body 54, for the reactor of FIGS. 5a and 5b. A seal against the inside surface of body 54 is provided by O-ring 101 and back-up O-rings 102. The piston is mounted to its drive mechanism by an adapter 67. Alignment coupler 92, shaft 100, position indicator drive disc 63, and rod 65 are as previously described. Rod 65 is coupled to drive disc 63 by a fitting 64. Fine adjustment of the piston position is made with shims 68 and 69.

EXAMPLE

A Hastelloy B2 jacketed kettle-shaped first reactor equipped with an anchor-type stirrer and pressure-rated to 300 psi was purged with nitrogen and vented to prevent condensation of moisture on the interior surfaces as it was cooled to below 0° C. The kettle temperature was controlled by means of a heat transfer fluid circulated in the external jacket. When the kettle temperature reached −5° C., methylene chloride (41.517 kg) was charged into it and cooled under agitation to a temperature below −10° C. Next, aluminum chloride (22.164 kg) was added, followed by dimethyl sulfone (two equal aliquots of 2.148 kg each). Each aliquot of dimethyl sulfone was made after the mixture was cooled back down to below −10° C. after the addition of the preceding material. (The dimethyl sulfone is added in aliquots because it complexes exothermically with the aluminum chloride and raises the temperature of the mixture, despite the cooling jacket and the agitation. By aliquot addition, the mixture is kept below 0° C. at all times.) Once the mixture temperature returned to below −10° C. after the addition of the last aliquot of dimethyl sulfone, terephthaloyl chloride (6.175 kg) was added, along with benzoyl chloride (0.154 kg) dissolved in methylene chloride (0.200 kg). After the above mixture had cooled to less than −13° C., 4,4′-diphenoxybenzophenone (11.346 kg) was added. The total charging time of all ingredients took about 30 min.

As soon as the addition of 4,4′-diphenoxybenzophenone was completed, the kettle reactor's vent was closed and a pressure of 10 psig of nitrogen was applied. The reactor was then isolated, and the vessel temperature was raised to 14° C. by means of a circulating heat transfer fluid in the vessel jacket. The exotherm of the reaction raised the temperature of the mixture to approximately 20° C. within approximately 10 min. The reaction was allowed to proceed under agitation for circa 17 min from the start of the last monomer addition. At the end of this time period, the pressure in the first reactor is increased by the addition of nitrogen until the internal pressure was 50 psig. Then, a bottom discharge valve on the kettle reactor, attached a hose connecting the kettle reactor to a second, tubular reactor, was opened and the agitation was stopped.

The second tubular reactor had 8 in. diameter × 6 ft length interior dimensions. It was lined with poly(tetrafluoroethylene). It had a piston with a conically shaped front, angled at 60°. It had a valved intake/discharge nozzle at its front, which was conically shaped to fit the piston. It was equipped with a jacket for circulating a temperature controlling fluid. At the start of the transfer, the piston was located at the front end of the tube, within 1/16 inch of the inside of the conical nozzle.

The valve at the front of the second reactor was opened and the piston retracted, allowing the reaction mass to flow from the first reactor to the second reactor through the connecting hose. The piston was retracted at a rate sufficient to drain the first reactor within three minutes. Once the transfer to the second reactor was completed, the valve at its front was closed. The jacket of the second reactor was maintained at 25° C. by means of a circulating heat transfer fluid.

Four hours after the transfer, the gelled mixture was discharged from the second reactor by stroking the piston forward at a displacement rate of 15 gal/hr. As the gel exited the reactor, it was passed into a Rietz hammer-mill where it was decomplexed with water flowing at 4–6 gal/min and ground by the hammers until the ground-up pieces could pass through the ⅛ inch diameter openings in the mill screen. The water helped convey the decomplexed polymer particles as a slurry through the screen, out of the mill, and into a receiving vessel.

The polymer was recovered and purified by the following wash sequence. After grinding in the hammer mill, the resulting polymer slurry is washed four times with deionized water by repeatedly filtering the solids from the slurry, then reconstituting the slurry with fresh deionized water. After the fourth wash, sufficient aqueous hydrochloric acid to the slurry to obtain a concentration of 0.15% hydrochloric acid by weight in the water phase. This slurry was then allowed to leach for six hours. The slurry was then heated and held at reflux for two hours; then water was stripped from the slurry for an additional six hours. The overhead was replaced with fresh deionized water to maintain a slurry concentration of 3.5 gallons of aqueous phase per pound of polymer solids. After the stripping step, the slurry was washed three times with deionized water in the manner described above. After the third wash, sufficient aqueous ammonia was added to the slurry to obtain a concentration of 0.15% ammonia by weight in the water phase. This slurry was heated at reflux for one hour. Finally, the slurry was again washed three times with deionized water as described above and recovered on a gravity Nutsche filter. The polymer was dried in a vacuum oven (an air circulating oven may also be used) at 200° C. for sixteen hours.

The polymer yield was approximately 15.4 kg, with an inherent viscosity of 1.07 dL/g.

We claim:

1. A method of preparing a poly(arylene ether ketone) by a Friedel-Crafts polymerization wherein a gelled reaction mixture is produced, comprising the steps of:
   (A) forming, in a first reactor, a reaction mixture for polymerization comprising
      (I) a monomer system comprising
         (a) (i) phosgene or an aromatic dicarboxylic acid dihalide and (ii) a substantially stoichiometric amount of a polynuclear aromatic comonomer having two active hydrogen atoms or
         (b) a polynuclear aromatic carboxylic acid halide having an active hydrogen atom; and
      (II) a Lewis acid in an amount of at least one equivalent per equivalent of carbonyl groups in the monomer system, plus an amount effective to act as a catalyst for the polymerization;
   (B) permitting the reaction mixture to polymerize in the first reactor until substantial partial polymerization has occurred, but before substantial gelation of the reaction mixture;
   (C) transferring the partially polymerized reaction mixture into a second reactor having a nozzle at one end thereof and a piston which, in its retracted position, is at the other end of the second reactor and has a stroke substantially equal to the length of the second reactor;
   (D) permitting polymerization to continue in the second reactor until a gelled, polymerized reaction mixture containing polymer of the desired molecular weight has been obtained;
   (E) discharging the gelled, polymerized reaction mixture from the second reactor through the nozzle by stroking the piston the length of the second reactor; and
   (F) recovering and purifying the polymer.

2. A method according to claim 1, wherein the reaction mixture further comprises a Lewis base in an amount from about 0.01 to about 4 equivalents per equivalent of acid halide groups in the monomer system and a non-protic diluent in an amount from 0 to 93% by weight based on the weight of the total reaction mixture and wherein the amount of the Lewis acid is greater than that specified in subparagraph (A) (II) by an amount of one equivalent per equivalent of Lewis base.

3. A method according to claim 1 or 2, wherein the monomer system comprises an aromatic dicarboxylic acid dihalide (a)(i) selected from the group consisting of terephthaloyl chloride, isophthaloyl chloride, [1,1'-biphenyl]-4,4'-dicarbonyl dichloride, and diphenyl ether-4,4'-dicarbonyl dichloride and a substantially stoichiometric amount of a polynuclear aromatic comonomer (a)(ii) selected from the group consisting of diphenyl ether, 1,4-diphenoxybenzene, 4,4'-diphenoxybenzophenone, 1,3-bis(4-phenoxybenzoyl)benzene, and 1,4-bis(4-phenoxybenzoyl)benzene.

4. A method according to claim 3, wherein the monomer system comprises diphenyl ether and terephthaloyl chloride.

5. A method according to claim 3, wherein the monomer system comprises 4,4'-diphenoxybenzophenone and terephthaloyl chloride.

6. A method according to claim 3, wherein the monomer system comprises 1,4-diphenoxybenzene and terephthaloyl chloride.

7. A method according to claim 3, wherein the monomer system comprises 1,4-bis(4-phenoxybenzoyl)benzene and terephthaloyl chloride.

8. A method according to claim 1 or 2, wherein the monomer system comprises a polynuclear aromatic carboxylic acid halide having an active hydrogen atom.

9. A method according to claim 8, wherein the monomer system comprises p-phenoxybenzoyl chloride.

10. A method according to claim 1 or 2, wherein the Lewis acid is aluminum chloride.

11. A method according to claim 1 or 2, wherein the reaction mixture for polymerization further comprises a capping agent.

12. A method according to claim 11, wherein the capping agent is a nucleophilic capping agent.

13. A method according to claim 11, wherein the capping agent is an electrophilic capping agent.

14. A method according to claim 1 or 2, wherein the reaction mixture for polymerization further comprises a nucleophilic and an electrophilic capping agent.

15. A method according to claim 1 or 2, wherein the first reactor is equipped with a stirring means.

16. A method according to claim 1 or 2, wherein in step (B) the reaction mixture is permitted to polymerize until its viscosity is between about 1,500 and about 12,000 centipoise.

17. A method according to claim 1 or 2, wherein in step (C) the partially polymerized reaction mixture is transferred into the second reactor by a combination of gravity feed and applying a positive nitrogen pressure, while simultaneously stroking the piston from a fully extended to a retracted position.

18. A method according to claim 1 or 2, wherein the second reactor is lined with a fluoropolymer.

19. A method according to claim 1 or 2, wherein the second reactor has an interior-length-to-interior-diameter ratio of at least 5.

20. A method according to claim 1 or 2, wherein the nozzle is conical in shape, the base of the cone coinciding with the cross-section of the second reactor, and the piston has a conical front end which fits within the nozzle when the piston is fully extended.

21. A method according to claim 1 or 2, wherein the first reactor is equipped with a temperature control means.

22. A method according to claim 1 or 2, wherein the second reactor is equipped with a temperature control means.

23. A method according to claim 1 or 2, wherein the second reactor is equipped with a valved vent adjacent to the retracted position of the piston.

24. A method according to claim 2, wherein the Lewis base is selected from the group consisting of diphenyl sulfone, dimethyl sulfone, N-methylformamide, N,N-dimethylformamide, N,N-dimethylacetamide, 1-methyl-2pyrrolidone, tetramethylene sulfone, n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, potassium chloride, potassium bromide, and mixtures thereof.

25. A method according to claim 24, wherein the Lewis base is selected from the group consisting of lithium chloride, N,N'-dimethylformamide, tetramethylene sulfone, and dimethylsulfone.

* * * * *